United States Patent [19]

Buthala et al.

[11] Patent Number: 5,518,265

[45] Date of Patent: May 21, 1996

[54] STRESS EQUALIZING TRANSITION TWIST BEAM AXLE

[75] Inventors: Charles A. Buthala, Augusta; Gary L. Wells, Kalamazoo, both of Mich.

[73] Assignee: Benteler Industries, Inc., Grand Rapids, Mich.

[21] Appl. No.: 341,373

[22] Filed: Nov. 17, 1994

Related U.S. Application Data

[63] Continuation-in-part of Ser. No. 115,437, Sep. 1, 1993, Pat. No. 5,409,255, which is a continuation of Ser. No. 823,997, Jan. 22, 1992, abandoned, which is a continuation-in-part of Ser. No. 565,658, Aug. 10, 1990, abandoned.

[51] Int. Cl.$^6$ .................................................. B60G 11/18
[52] U.S. Cl. ................................. 280/723; 301/124.1
[58] Field of Search ............................. 280/700, 721, 280/723, 726, 665, 689; 180/905; 301/127, 124.1

[56] References Cited

U.S. PATENT DOCUMENTS

| | | | |
|---|---|---|---|
| 3,362,056 | 1/1968 | Preller et al. | 29/897.35 |
| 3,767,224 | 10/1973 | Schneeweiss | 280/124 |
| 3,951,225 | 4/1976 | Schwenk | 280/700 |
| 4,232,881 | 11/1980 | Kolbel | 280/721 |
| 4,432,564 | 2/1984 | Tronville | 280/689 |
| 4,486,030 | 12/1984 | Takata | 280/689 |
| 4,700,796 | 10/1987 | Morlok | 180/88 |
| 4,787,680 | 11/1988 | Bonjean | 301/124 |
| 5,163,225 | 11/1992 | Goleby | 29/897.35 |
| 5,310,210 | 5/1994 | Delbeke | 280/673 |
| 5,310,211 | 5/1994 | DelBeke | 280/673 |
| 5,324,073 | 6/1994 | Alatalo | 280/723 |

FOREIGN PATENT DOCUMENTS

| | | | |
|---|---|---|---|
| 2740948 | 3/1979 | Germany | 280/723 |
| 2241209 | 8/1991 | United Kingdom . | |

OTHER PUBLICATIONS

V-profile twist beam shown and described in the attached drawings.

*Primary Examiner*—Paul N. Dickson
*Attorney, Agent, or Firm*—Price, Heneveld, Cooper, DeWitt & Litton

[57] ABSTRACT

A torsion-bar-free, unitary, twist beam axle having stress transition character capable of handling both vehicle suspension bending loads and torsion loads without a separate torsion bar, comprising a one-piece, integral twist beam elongated in the direction of its axis, and having a pair of legs elongated in the direction of the axis and extending transverse to the axle axis to outer distal ends, the legs each having an elongated portion looped back upon itself into elongated, peripherally closed loops at said outer distal ends to form a pair of closed loops spaced from and generally parallel to each other, the axle having a central portion, and a pair of mounting ends for attachment to vehicle trailing arms, and a pair of stress transition members extending respectively from the mounting ends toward the central portion and located substantially between the closed loops, these members having a pair of spaced walls connected by a bight and with sufficient resistance to flexing movement toward each other to limit movement by the loops toward each other and to limit loop movement in opposite axial directions along the axis, under torsional stress applied to the axle. The ends of these walls are shown to curve under the loops for weldment thereto. The stress transition members taper in height along their length, from the highest height at the inner ends thereof.

7 Claims, 3 Drawing Sheets

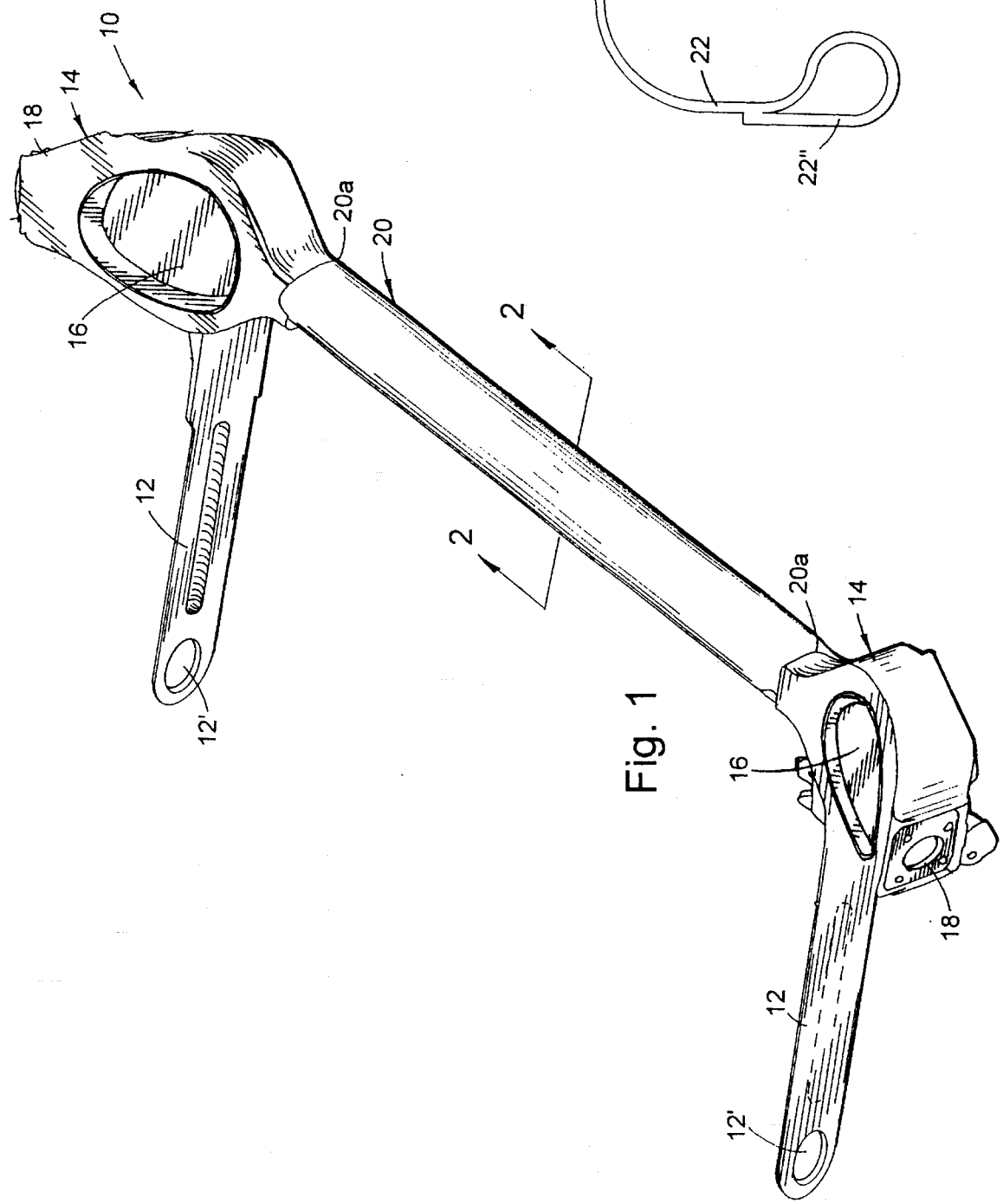

STRESS EQUALIZING TRANSITION TWIST BEAM AXLE

RELATED APPLICATIONS

This application is a continuation-in-part of application Ser. No. 115,437, filed Sep. 1, 1993, entitled TWIST BEAM AXLE (now U.S. Pat. No. 5,409,255), which is a continuation of application Ser. No. 823,997, filed Jan. 22, 1992, entitled TWIST BEAM AXLE (now abandoned), which is a continuation-in-part application of application Ser. No. 565,658, filed Aug. 10, 1990, entitled TWIST BEAM AXLE (now abandoned); and is related to application Ser. No. 116,209, filed Sep. 2, 1993, entitled TWIST BEAM AXLE (now U.S. Pat. No. 5,324,073), which is a continuation of application Ser. No. 823,997, filed Jan. 22, 1992, entitled TWIST BEAM AXLE (now abandoned), which is a continuation-in-part of application Ser. No. 565,658, filed Aug. 10, 1990, entitled TWIST BEAM AXLE (now abandoned).

BACKGROUND OF THE INVENTION

This invention relates to vehicle axles and axle subassemblies, and particularly to trail arm twist beam axles and axle subassemblies.

A trail arm twist beam axle is intended to semi-isolate one wheel of a vehicle such as an automobile from the opposite wheel. Connection points are made to the body mounts, wheel spindles, shocks and springs, as well as to track bars for lateral stability. Individual component pieces typically making up an axle assembly include the twist beam, trail arms, flanges, spring supports, jounce bumpers, shock mounts, bushing mounts and torsion bar.

Various cross sectional configurations have been suggested for twist beam and torsion bar elements heretofore, although typically a twist beam comprises an inverted, U-shaped beam for bending loads, coupled with a separate solid torsion rod of different material and characteristics from those of the beam, and extending through the open central portion of the beam, for accommodating torsional loads. The U-shaped beam is normally a drawn or stamped member which is not particularly strong in torsion. Both ends are attached to stubs extending in from the spring seats. The separate rod to control torsional loads is specially fabricated of a high strength steel. Its ends are attached separately from, and in a special relationship relative to, the ends of the beam. The material costs, manufacturing costs and assembly costs of the two-piece twist beam and torsion bar arrangement are significant. Some very light weight automobiles are capable of using the beam without a torsion bar, but the torsion bar is included if the vehicle is expected to carry any significant load, is a heavier-type vehicle, or is to have quality handling characteristics.

In the prior patent applications identified above, employees of the assignor herein disclosed a specially constructed twist beam axle free of the necessity of a customary torsion bar which adds weight and cost, but having excellent torsional strength. In the above-identified U.S. Pat. No. 5,324,073 is set forth a tuned twist beam axle allowing axles to have a variety of good torsional characteristics to suit the style and nature of the vehicle involved.

In all of these axles set forth in the above-related applications, torsional stress applied to the structures has been found to cause certain complex movements to occur in the axle portions. Specifically, under torsion, i.e., where the two ends of the axle are twisted in opposite rotary directions, the two legs and the two loops on the legs of the axle not only tend to move toward each other transverse to the axle axis, but also tend to move in opposite directions to each other parallel to the axle axis. The torsional stresses and these resulting complex movements are illustrated by the arrows in FIG. 6. The stress to the axle caused by these movements is greatest at the axle mounting to the spring pods, at the opposite ends of the axle, and decreases from these locations, toward the central portion of the axle. The goal of the present invention is to alleviate these axle end stresses with a special axle structure.

SUMMARY OF THE INVENTION

The present invention thus provides novel twist beam axle structure which creates a generally continuous stress transition between the generally free twist beam axle portions adjacent the center of the axle, and the constrained axle ends where the axle is mounted to the spring pods, i.e., where the spring seats, trailing arms and spindles join the axle. The novel structure constrains lateral motion of the twist beam axle loops parallel to the axle axis, during torsion, while also gradually constraining the relative transverse motion between the twist beam axle loops toward each other in the fore/aft direction, i.e., transverse to the axle axis. The result in effect is to convert an open cross section in the center of the axle to a closed cross section toward the ends of the axle, eliminating stress concentrations due to the complex motions of the twist beam axle portions under torsion, and eliminating abrupt changes in rigidity of portions of the axle.

These objects are achieved by having the unitary twist beam axle incorporate a pair of stress transition members extending from the mounting ends of the axle toward the central portion thereof, located substantially between the loops of the legs of the beam. Each stress transition member has a pair of walls spaced from each other and positioned adjacent the axle legs, in a generally inverted, U-shaped fashion. The lower ends of the members preferably are concavely curved, extending outwardly away from each other beneath the axle leg loops to which they are welded. Each member varies in height from its smallest height, i.e., smallest vertical dimension (FIG. 4), with the greatest spring constant at the outer end of the axle, to its greatest height i.e., greatest vertical dimension, with the lowest spring constant toward the central portion of the axle. The members preferably taper gradually between the lowest height and the greatest height, achieving the continuous stress transition between the relatively free central portion of the axle and the constrained ends of the axle, while eliminating the stress concentration due to the complex motions and eliminating abrupt changes in axle rigidity.

These and other objects, advantages and features of the invention will become apparent upon studying the following specification in conjunction with the drawings.

BRIEF DESCRIPTION OF THE DRAWINGS

FIG. 1 is an isometric view of a trail arm axle assembly employing this invention;

FIG. 2 is a cross sectional view on plane 2—2 of FIG. 1;

DESCRIPTION OF THE PREFERRED EMBODIMENT

Figure 3:
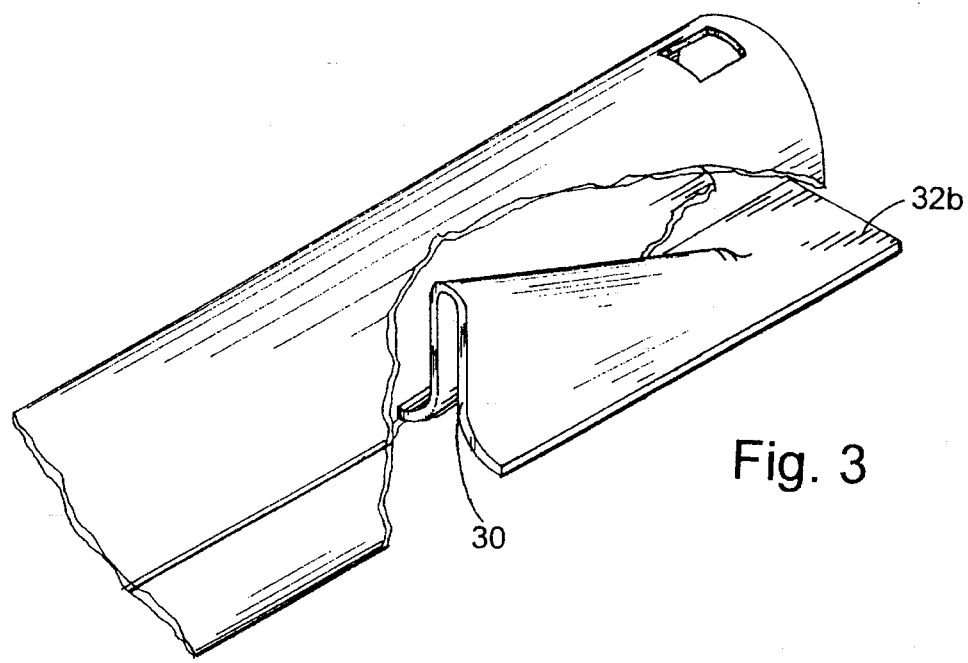
FIG. 3 is a fragmentary, isometric view of the right end of the twist beam axle in FIG. 1.
Figure 4:
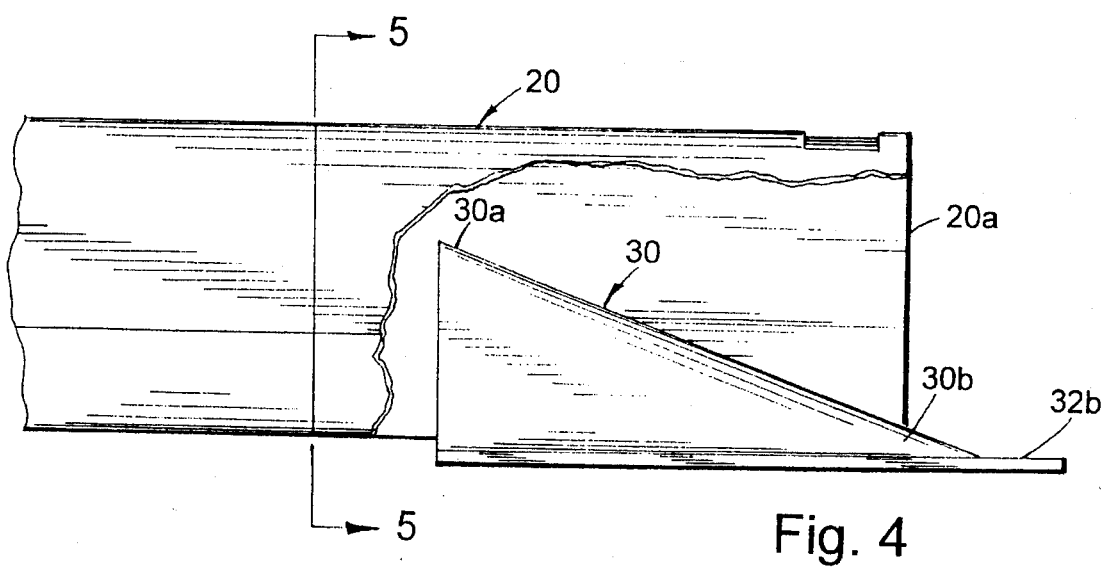
FIG. 4 is an elevational view of the twist beam axle portion in FIG. 1.

Referring now specifically to the drawings, the axle assembly 10 there depicted includes a pair of spaced, generally parallel trailing arms 12 each having a pivot mount 12' at the forward end thereof for attachment to the vehicle (not shown) and a spring pod subassembly 14 at the rear end of each of the trailing arms. Each spring pod subassembly includes a spring seat 16 on which a coil spring rests and a spindle mount 18 for supporting the wheel spindles (not shown).

Extending between these spring pods is a unitary twist beam axle subassembly 20 on an elongated axis transverse to the length dimension of the vehicle. This twist beam axle is a one-piece, integral twist beam of inverted, generally U-shaped configuration, having a pair of depending legs 22 in cross section (FIG. 2), these legs being joined at an integral bight 22'. These legs are elongated, extending generally the length of the beam, and extend transverse to the beam axis. The outer distal ends of legs 22 are looped back upon the legs and welded thereto to form peripherally closed loops 22" integral with the beam. These loops are spaced from each other and extend parallel to the beam axis generally parallel to each other, substantially over the length of the beam. The elongated twist beam axle includes a central portion and a pair of mounting ends. The mounting ends are attached to the spring pods at junctions 20a, usually by welding.

Figure 5:
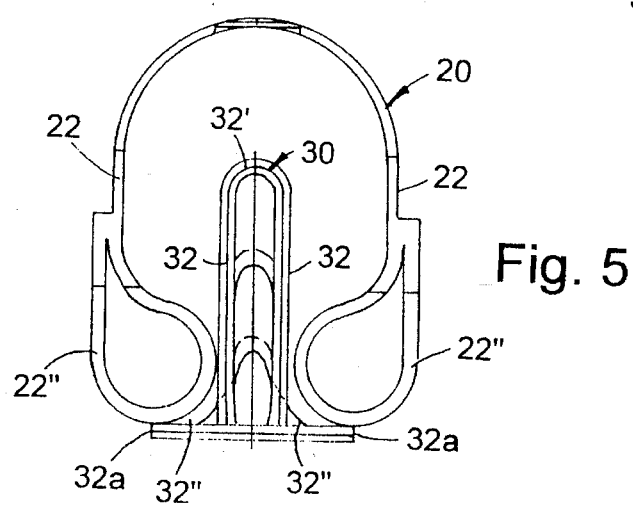
FIG. 5 is a sectional view taken on plane 5—5 of FIG. 4.

A pair of specially formed stress transition members 30 form part of the beam axle 20 adjacent opposite ends of the beam. Each of these transition members extends from the mounting ends of the beam toward the central portion. The members are located substantially between the axle beam legs, and particularly between loops 22" of legs 22, having a width substantially equal to the spacing between loops 22" to engage these loops. Each member has a pair of generally parallel walls 32 of a single layer of material (the line in FIG. 5 at the center of element 30 is a centerline), the two walls 32 being spaced from each other but joined at an upper bight 32' to form a generally inverted U-shaped element in cross section. The lower ends of walls 32 curve concavely outwardly away from each other at 32", with a radius of curvature substantially the same as that of loops 22 in that region, so as to be in generally full engagement with the loops. The terminal ends of these walls at 32a are MIG welded to the loops. Conceivably these concave ends of walls 32 may be shortened, as long as access is adequate to weld the walls to the loops. Each of these members 30 has a flat outer axial end 32b which extends beyond the end of the beam and is welded to the respective spring pod 14 as by MIG welding. The innermost end 30a of each member 30 has the greatest height, i.e., greatest vertical dimension while the outermost end 30b adjacent the end 20a junction of beam 20 has the smallest height, i.e., smallest vertical dimension. Preferably the height of member 30 gradually tapers from lowest end 30b to highest end 30a as depicted. Walls 32 of member 30 can flex a limited amount toward each other about bight 32'. The spring constant of shorter end 30b is considerably greater than that of the greater height end 30a. Hence, the amount of resistance to flexing between legs 32 at the shorter end will be considerably greater, so that the amount of potential flexing there will be less. Therefore, when torsional stress is applied to the beam, tending to cause loops 22" to move toward each other, this stress equalizing transition member will controllably constrain the relative motion between the axle leg loops in the forward/aft direction toward each other, while eliminating stress concentrations due to the complex motion tendencies of the axle.

This unique structure is capable of functioning effectively as a twist beam axle without the customary torsion rod extending between the spring pods and without high stress otherwise concentrated at the mounting of the axle beam to the spring pods. The structure is capable of readily accommodating torsional loads as well as bending loads.

Figure 6:
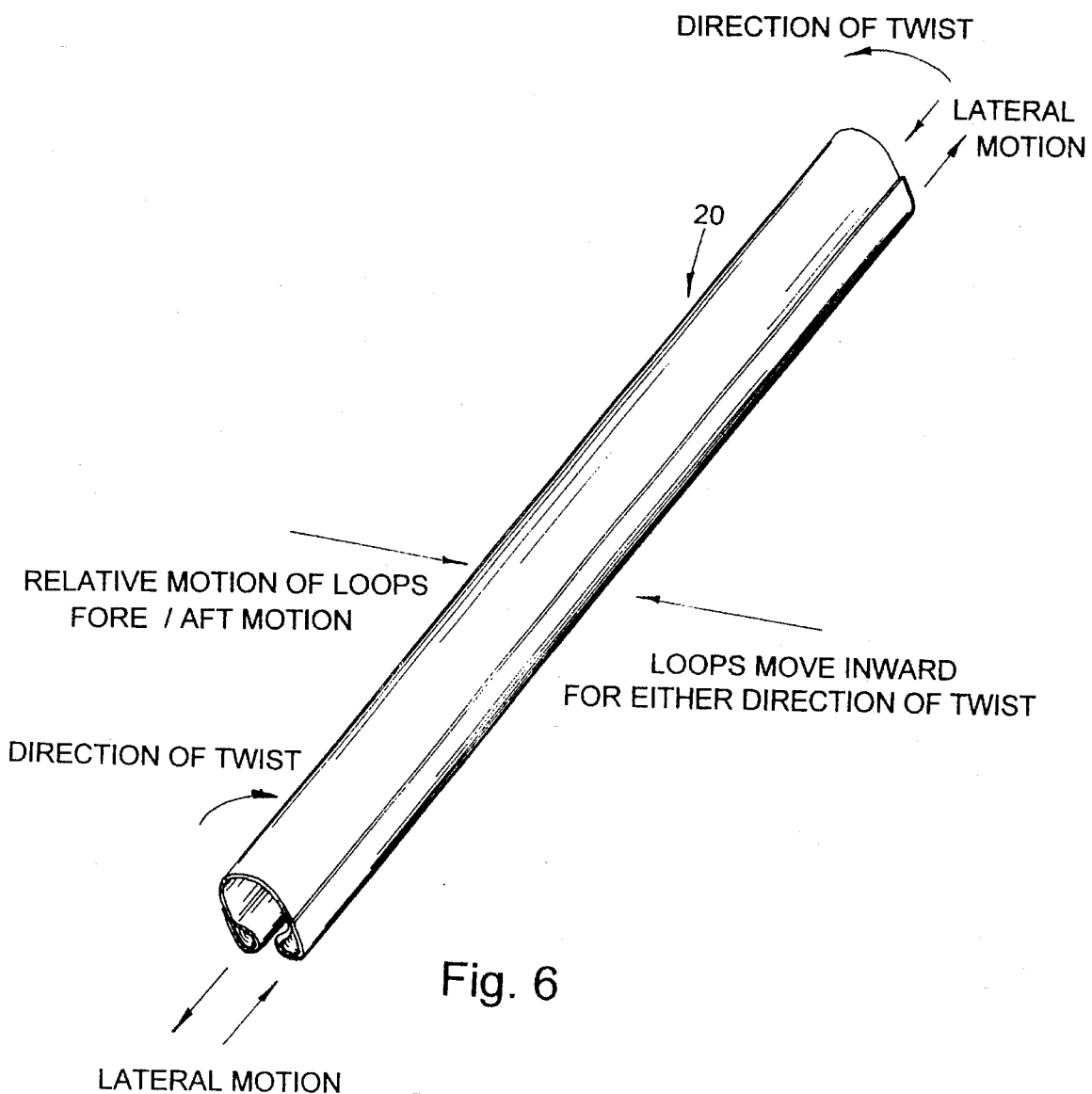
FIG. 6 is an isometric view of an axle of prior above-identified applications, showing components of the complex movement occurring when the axle is placed under torsional stress, indicated by arcuate arrows.

The loops on the beam legs can also be selectively flattened, as in U.S. Pat. No. 5,324,073, for tuning. During operation, it has been determined that the twist beam axle of this above-described construction still tends to have complex tendencies for movements, with resulting stresses being controlled. Referring specifically to FIG. 6, when the opposite ends of the axle are twisted in opposite rotary directions under torsional load as depicted by the arcuate arrows, loops 22" still tend to move relative toward each other, i.e., transverse to the axis of the beam, as indicated by the two arrows in the center of FIG. 6. The openings in the bight 22' at the ends of beam 20 are just for mounting conventional rubber bumpers which are not depicted. Furthermore, the torsional load on the beam still causes the two loops 22" to move axially relative to each other, i.e., parallel to the axis of the beam, in opposite axial directions, i.e., lateral motion relative to the vehicle. If the torsional twist is in the opposite direction from that illustrated by the arrows in FIG. 6, loops 22" still tend to move toward each other as described above, but tend to move axially in the opposite directions from those shown by the linear arrows at the ends of the beam in FIG. 6. The present invention controls these complex motion tendencies to effect stress equalization by creating a continuous stress transition between the relatively free central portion of the axle to the constrained end portions of the axle where the spring seat trailing arms and spindles meet. In other words, the novel construction constrains lateral motion (fore/aft) of the axle loops during torsion, and in opposite axial directions. It tends to eliminate stress concentrations due to complex motion of the beam portions, and abrupt changes in rigidity over the length of the beam.

More specifically, when loops 22 and loops 22" tend to move toward each other, to move they must also flex walls 32 of members 30 toward each other against the bias of bights 32' of members 30. This flex resisting bias or resistance is greatest at the outer ends of members 30 (and axle 20), and gradually decreases toward the inner ends of members 30.

Although the preferred embodiment for accomplishing the inventive concept herein is set forth herein as illustrative of the invention, it is conceivable that the construction may be modified somewhat in configuration to suit a particular installation. Hence, it is not intended that the invention be limited to the specific illustrative preferred embodiment, but only by the scope of the appended claims and the reasonably equivalent structures to those defined therein.

The embodiments of the invention in which an exclusive property or privilege is claimed are defined as follows:

1. A torsion-bar-free, unitary, twist beam axle having stress transition character on an axis and capable of handling both vehicle suspension bending loads and torsion loads without a separate torsion bar, comprising a one-piece, integral twist beam elongated in the direction of said axis, and having a pair of legs elongated in the direction of said axis and extending transverse to said axis to outer distal ends thereof;

said legs each having an elongated portion looped back upon itself into elongated, peripherally closed loops at said outer distal ends, integral with the remainder of said leg, to thereby form a pair of closed loops spaced from and. generally parallel to each other;

said axle having a central portion, and a pair of mounting ends for attachment to vehicle trailing arms; and a pair of stress transition members extending respectively from said mounting ends toward said central portion and located substantially between said closed loops, said members having sufficient resistance to movement toward each other to limit movement by said loops toward each other and to limit loop movement in opposite axial directions along said axis, under torsional stress applied to said axle, said stress transition members varying in vertical height from a smaller height with the greatest spring constant at said mounting ends to a greater height with the smallest spring constant toward said central portion.

2. The torsion-bar-free, unitary, twist beam axle in claim 1 wherein each of said stress transition members has a pair of walls spaced from each other, positioned adjacent said loops respectively, and connected to each other by a bight.

3. The torsion-bar-free, unitary, twist beam axle in claim 1 wherein each of said stress transition members is of inverted, generally U-shaped configuration.

4. The torsion-bar-free, unitary, twist beam axle in claim 3 wherein each of said stress transition members has concave curving ends extending outwardly away from each other beneath said loops.

5. The torsion-bar-free, unitary, twist beam axle in claim 4 wherein said concave curving ends are welded to said loops.

6. The torsion-bar-free, unitary, twist beam axle in claim 2 wherein said members have a width substantially equal to the space between said spaced loops.

7. The torsion-bar-free, unitary, twist beam axle in claim 1 wherein each of said stress transition members tapers from said smaller height to said greater height.

* * * * *